(No Model.)
J. TATHAM.
CONDUIT FOR ELECTRICAL CONDUCTORS.
No. 417,688. Patented Dec. 17, 1889.
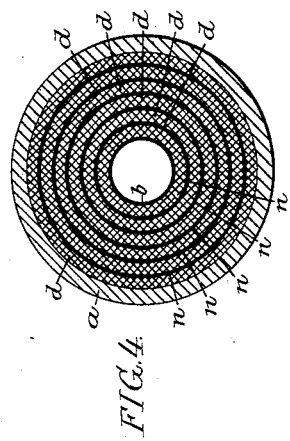
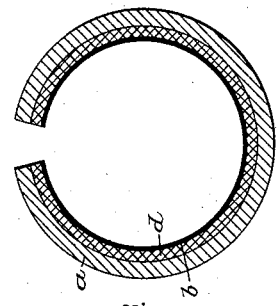
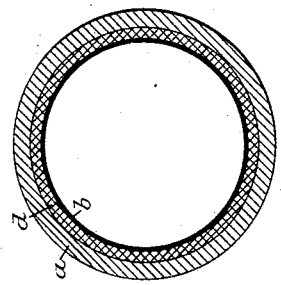
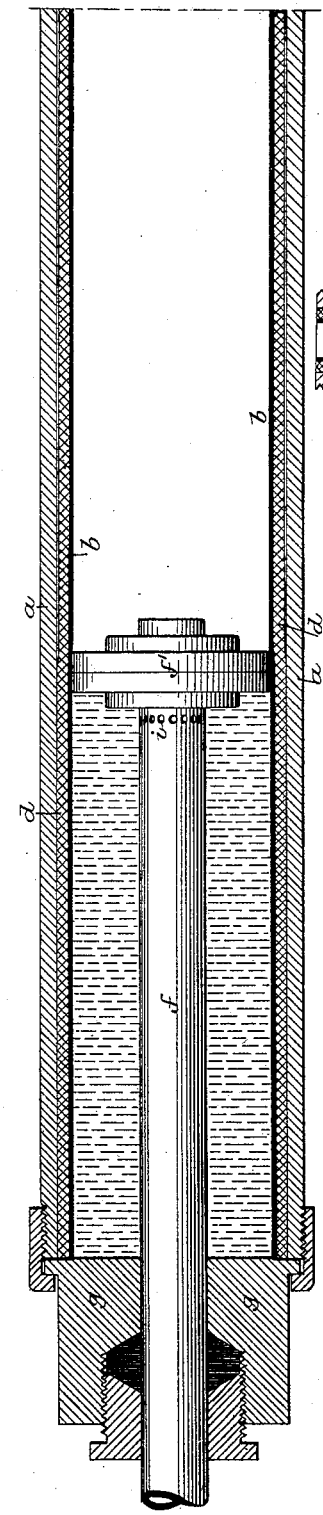
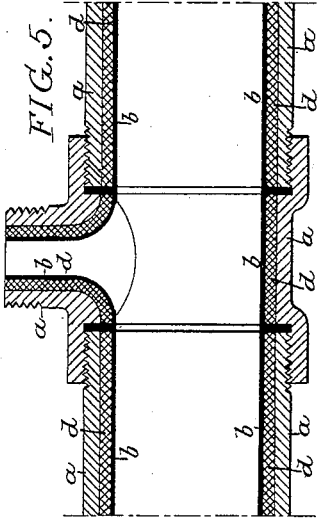
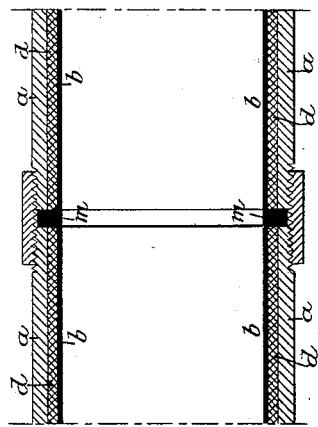
Witnesses:
Murray C Boyer
Alex. Barkoff
Inventor.
James Tatham
by his Attorneys
Howson & Howson

UNITED STATES PATENT OFFICE.

JAMES TATHAM, OF PHILADELPHIA, PENNSYLVANIA, ASSIGNOR OF ONE-HALF TO HENRY B. TATHAM, OF SAME PLACE.

CONDUIT FOR ELECTRICAL CONDUCTORS.

SPECIFICATION forming part of Letters Patent No. 417,688, dated December 17, 1889.

Application filed September 23, 1889. Serial No. 324,796. (No model.)

*To all whom it may concern:*

Be it known that I, JAMES TATHAM, a citizen of the United States, and a resident of Philadelphia, Pennsylvania, have invented certain Improvements in Conduits for Electrical Conductors, of which the following is a specification.

The object of my invention is to so construct a conduit for electrical conductors that it will provide an effective insulation for the same, can be manufactured at small cost, and will be practically indestructible under ordinary conditions of use. This object I attain in the manner hereinafter set forth, reference being had to the accompanying drawings, in which—

Figure 1 is a transverse section of a conduit for electrical conductors made in accordance with my invention. Fig. 2 is a longitudinal section showing a joint between successive lengths of the conduit. Figs. 3 and 4 are transverse sections of special forms of conduit made in accordance with my invention. Fig. 5 is a longitudinal section of a branch joint between successive lengths of conduit, and Fig. 6 is a longitudinal section illustrating the preferable method of making the conductor.

My improved conduit consists of an outer pipe or casing $a$, an internal lining-tube $b$, and a layer $d$, of insulating material, confined or compressed between the outer pipe or casing and the lining-tube. The outer pipe or casing $a$ is preferably of cylindrical form and of iron or steel, an ordinary wrought-iron pipe being available for the purpose. The interposed insulating-layer $d$ is preferably a tubular web, of textile material, coated or saturated with the insulating material or compound, and the lining $b$ is in the form of a seamless tube of metal.

An effective method of making my improved conduit is to draw into the outer pipe or casing first a comparatively loose-fitting insulating-tube and then a like loose-fitting lining-tube; or the insulating-tube may be first drawn over the lining-tube and the two then introduced into the outer pipe or casing together. When in place in the pipe or casing, the lining-tube and the intermediate insulating-web are secured in said outer pipe or casing by radially expanding said lining-tube, whereby the insulating-tube is firmly compressed between said lining-tube and the outer pipe or casing, the lining-tube itself being caused to bear so firmly against the insulating-tube that any movement of one part of the conduit independently of the other is impossible, and the conduit is thus rendered practically as homogeneous as a single pipe.

For the purpose of expanding the lining-tube within the outer pipe or casing I prefer to use a hydraulic expanding device, sufficient of which is represented in Fig. 6 to illustrate its operation. This device comprises a hollow mandrel $f$, communicating at one end with a supply of liquid under heavy pressure, and having at the other end a packed head $f'$, which, in the present instance, is inserted into the end of the lining-tube of the conduit, to which it fits so snugly as to prevent the escape of liquid between the two. The end of the conduit is then closed by means of a cap $g$, which forms a tight joint with said end of the conduit and has a stuffing-box for the hollow mandrel. Liquid under pressure being admitted to the hollow mandrel, escapes therefrom through openings $i$ into the space between the packed head $f'$ and the closing-cap $g$. The liquid being under heavy pressure, first radially expands that portion of the lining-tube $d$ which is between the head $f'$ and the end of the conduit until such expansion is arrested by the compression of the insulating-tube, and as the flow of liquid is continued the conduit, with its closing-cap, is forced along over the mandrel in the direction of the arrow, the expansion of the lining-tube progressing continuously during this movement until the packed head of the mandrel finally emerges from the opposite end of the conduit. The lining-tube and the insulating-tube should, in the first instance, be somewhat longer than the outer pipe or casing to compensate for the contraction in their length, which is due to their radial expansion.

Although water may be used as the expanding agent, I prefer in most cases to use oil for this purpose, as the presence of a small quantity of oil in the conduit is not objectionable, whereas the presence of water or the vapor of water within the conduit is to be avoided.

A mechanical expander forced through the conduit may in some cases be used, instead of the fluid-expansion device shown, for expanding the lining-tube, or the tube may be inserted in the outer pipe or casing and the insulating material then introduced between the two.

In connecting successive lengths of my improved conduit together it is preferable to interpose between the ends of the conduit-sections a ring or washer $m$, of insulating material, so that adjoining lengths of the conduit are effectively insulated from each other, and as the lining of each section of conduit is insulated from the outer pipe or casing it follows that the conduit provides an insulating casing or covering for the conductor throughout its entire length. As the lining of the conduit is, moreover, perfectly smooth, the conductor may be readily drawn through the same without causing excessive friction either upon the conductor or the conduit, lining, this being a matter of considerable importance where the conductor is provided with an insulating-cover, as the drawing of such conductor through a long conduit having a rough interior surface is likely to rub the insulating-covering from the wire.

As my improved conduit is in itself an insulator, the providing of the conductor with a special insulating-covering is not absolutely necessary, and in many cases the conduit may be slotted—as in Fig. 3, for instance—to permit of the passage of a contact-bar making connection with a naked conductor within the conduit.

A conducting-conduit can also be constructed in accordance with my invention by inserting and compressing within the outer pipe or casing successive insulating and conducting tubes. For instance, in Fig. 4 I have shown a conduit in which a series of insulated conducting-tubes $n$, preferably of copper, are introduced between the outer pipe or casing $a$ and the lining $b$.

In making a branch connection between successive lengths of a conduit it is preferable to provide this connection also with a lining and with insulating material interposed between said lining and the outer casing, as shown, for instance, in Fig. 5.

Having thus described my invention, I claim and desire to secure by Letters Patent—

1. The within-described conduit for electrical conductors, consisting of an outer pipe or casing, a metal lining-tube, and an interposed layer of insulating material immovably confined between said casing and lining, substantially as specified.

2. The combination, in a conduit for electrical conductors, of the conduit-sections, each comprising a metallic casing, a metal lining-tube, and a layer of insulating material immovably confined between the said casing and lining, with insulating rings or washers interposed between successive lengths of the conduit and serving to insulate the linings of the sections from each other and to prevent the formation of a circuit between the lining and outer casing at the end of either section of the conduit, substantially as specified.

3. The mode herein described of making a conduit for electrical conductors, said mode consisting in inserting within an outer pipe or casing a layer of insulating material and a lining-tube and then expanding this lining-tube, so as to compress the insulating material between the same and the outer casing, substantially as specified.

4. The mode herein described of making a conduit for electrical conductors, said mode consisting in inserting within an outer pipe or casing a layer of insulating material and a lining-tube and then expanding this lining-tube by forcing fluid under pressure into the same, beginning at one end of the conduit and extending progressively through the same, substantially as specified.

In testimony whereof I have signed my name to this specification in the presence of two subscribing witnesses.

JAMES TATHAM.

Witnesses:
R. SCHLEICHER,
HARRY SMITH.